(12) United States Patent
Van Der Aar et al.

(10) Patent No.: US 6,409,874 B1
(45) Date of Patent: Jun. 25, 2002

(54) RUBBER TO METAL BONDING BY SILANE COUPLING AGENTS

(75) Inventors: Cornelis P. J. Van Der Aar, Roermond (NL); Wim J. Van Ooij, Fairfield, OH (US)

(73) Assignees: Vernay Laboratories, Inc., Yellow Springs, OH (US); University of Cincinnati, Cincinnati, OH (US)

(*) Notice: Subject to any disclaimer, the term of this patent is extended or adjusted under 35 U.S.C. 154(b) by 0 days.

(21) Appl. No.: 09/509,275

(22) PCT Filed: Oct. 23, 1998

(86) PCT No.: PCT/US98/22576

§ 371 (c)(1),
(2), (4) Date: Jun. 19, 2000

(87) PCT Pub. No.: WO99/20705

PCT Pub. Date: Apr. 29, 1999

Related U.S. Application Data

(60) Provisional application No. 60/062,738, filed on Oct. 23, 1997.

(51) Int. Cl.$^7$ .................................................. C09J 5/04
(52) U.S. Cl. ............. 156/314; 106/287.11; 106/287.13; 156/326
(58) Field of Search ................................ 156/326, 314; 106/287.11, 287.13

(56) References Cited

U.S. PATENT DOCUMENTS

| | | |
|---|---|---|
| 2,751,314 A | 6/1956 | Keil |
| 3,022,196 A | 2/1962 | Jenkins et al. |
| 3,527,655 A | 9/1970 | Ballard |
| 4,087,585 A | 5/1978 | Schulz |
| 4,179,537 A | 12/1979 | Rykowski |
| 4,281,094 A | 7/1981 | Homan et al. |
| 4,401,500 A | 8/1983 | Hamada et al. |
| 4,483,951 A | 11/1984 | Brenner |
| 4,526,922 A | 7/1985 | Pickwell et al. |
| 4,534,815 A | 8/1985 | Hamada et al. |
| 4,618,389 A | 10/1986 | Agodoa |
| 4,681,636 A | 7/1987 | Saito et al. |
| 4,810,748 A | 3/1989 | Spells |
| 4,855,378 A | 8/1989 | Pradl et al. |
| 4,882,369 A | 11/1989 | Maxson |
| 5,079,090 A | 1/1992 | Joseph et al. |
| 5,108,793 A | 4/1992 | van Ooij et al. |
| 5,200,275 A | 4/1993 | van Ooij et al. |
| 5,292,549 A | 3/1994 | van Ooij et al. |
| 5,363,994 A | 11/1994 | Angeline |
| 5,433,976 A | 7/1995 | van Ooij et al. |
| 5,455,080 A | 10/1995 | van Ooij |
| 5,478,655 A | 12/1995 | Sabata et al. |
| 5,728,203 A | * 3/1998 | Vorse et al. ............ 106/287.11 |
| 5,750,197 A | 5/1998 | van Ooij et al. |
| 5,759,629 A | 6/1998 | van Ooij et al. |

FOREIGN PATENT DOCUMENTS

| | | |
|---|---|---|
| CA | 764537 | 8/1967 |
| EP | 492306 A2 | 1/1992 |
| JP | 0000232 | 1/1978 |

OTHER PUBLICATIONS

Silane Coupling Agents, Dow Corning Corporation, 1981; 15 pages.

Plueddemann, E.P., "Silane Primers for Epoxy Adhesives," *Journal of Adhesion Science and Technology*, vol. 2, No. 3, 1988 (pp. 179–188).

Chen, R. et al., "Infrared and X–ray Photoelectron Spectroscopy of Aminophenyltrimethoxysilane Films on Metals," *Journal of Adhesion Science and Technology* vol. 4, No. 6, 1990 (pp. 453–463).

Pape, P.G. et al., "Methods for Improving the Performance of Silane Coupling Agents," *Journal of Adhesion Science and Technology*, vol. 5, No. 10, 1991 (pp. 831–842).

Walker, P., "Organosilanes as Adhesion Promotors," *Silanes and Other Coupling Agents*, 1992 (pp. 21–47).

Mauerer, F.J. et al., "Positron Annihilation in Polyethylene and Azidosilane–Modified Glass/Polyethylene Composites," *Silanes and Other Coupling Agents*, 1992 (pp. 365–377).

Buchwalter, L.P. et al. "Adhesion of Polyimides to Ceramics: Effects of Aminopropyltriethoxysilane and Temperature and Humidity Exposure on Adhesion," *Silanes and Other Coupling Agents*, 1992 (pp. 411–421).

Park, J.M. et al., "Interfacial Shear Strength and Durability Improvement by Monomeric and Polymeric Silanes in Basalt Fiber/Epoxy Single–Filament Composite Specimens," *Silanes and Other Coupling Agents*, 1992 (pp. 473–491).

Drown, E.K. et al., "Glass Fiber 'Sizings' and Their Role in Fiber Matrix Adhesion," *Silanes and Other Coupling Agents*, 1992 (pp. 513–529).

Allen, K.W., "Silanes as the Interphase in Adhesive Bonds," *Journal of Adhesion Science and Technology*, vol. 6, No. 1, 1992 (pp. 23–32).

(List continued on next page.)

*Primary Examiner*—John J. Gallagher
(74) *Attorney, Agent, or Firm*—Biebel & French, L.P.A.

(57) ABSTRACT

Adhesion of rubber to a variety of metals (aluminum, stainless steel, mild steel and brass) is effectively achieved by the application of an organofunctional silane (I) and a non-organofunctional silane (II) to the requisite surface. Preferably, the organofunctional silane (I) is a vinyltrialkoxysilane with the non-organofunctional silane (II) preferably comprising an alkoxylated substituted alkyl silane. The silanes (I) and (II) are at least partially hydrolyzed and are normally provided in the form of a EtOH/H$_2$O solution. Bonded joints formed by these adhesive treatments can withstand fuel degradation tests indicating that the treatments can be used, for example, to bond metal and rubber surfaces in automotive and other environments in which the joined parts will be contacted by fuels, oil and/or organic solvents.

35 Claims, No Drawings

OTHER PUBLICATIONS

Collier, B.J. et al., "Use of Coupling Agents for Internally Reinforced Rayon Fibers," *Silanes and Other Coupling Agents*, 1992 (pp. 531–539).

van Ooij, W. J. et al., "Characterization of Polymer Surfaces and Polymer–Metal Interfaces by Static Secondary Ion Mass Spectrometry," *Surface and Interface Analysis*, vol. 19, 1992 (pp. 101–113).

Sabata, A. et al, "The Interphase in Painted Metals Pretreated by Functional Silanes," *Journal of Adhesion Science and Technology*, vol. 7, No. 11, 1993 (pp. 1153–1170).

Coast, R. et al., "A Vibrational Spectroscopic Comparison of Vinyltriethoxysilane and Vinyl Phosphoric Acid Adsorbed on Oxidized Aluminum," *Journal of Adhesion Science and Technology*, vol. 10, No. 2, 1996 (pp. 101–121).

Hörnström, S–E, et al., "Paint Adhesion and Corrosion Performance of Chromium–Free Pretreatments of 55% Al–Zn–Coated Steel," *Journal of Adhesion Science and Technology*, vol. 10, No. 9, 1996 (pp. 883–904).

\* cited by examiner

RUBBER TO METAL BONDING BY SILANE COUPLING AGENTS

CROSS REFERENCE TO RELATED APPLICATION

This application claims the benefit of prior filed copending U.S. Provisional Application No. 60/062,738 filed Oct. 23, 1997.

FIELD OF THE INVENTION

This invention relates to methods for adhering rubber to metal surfaces.

BACKGROUND OF THE INVENTION

Reliable metal to rubber adhesion is required for many commercial and industrial parts. For example, rubber to metal adhesion is required in the automotive, medical, appliance and other industries where basic functions such as fluid control, energy conversion, sealing, vibration isolation and/or combinations of these functions are required. Additionally, tire to metal, metallic reinforcement of conveyor belts and hoses, and vibration dampening on motor and railroad mounts are further examples of industrial situations in which a variety of metals need to be adhesively bound to an associated rubber substrate.

Fluorosilicone elastomers have become increasingly popular due to their excellent high and low temperature performance. These elastomers also demonstrate advantageous resistance to fuels, oils, chemicals etc. due to the presence of the trifluoropropyl moiety in their repeat unit formula

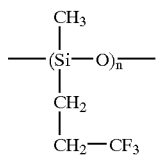

The polysiloxanes are crosslinked via pendent vinyl moieties by curing with peroxides. Compounds of fluorosilicones are formulated with reinforcing silica, various processing aids and other additives. These elastomers ar of special interest in the automotive industry where they can be used as conduits, valves or diaphragms and the like if properly adhesively bound to ancillary metal equipment.

It has however been difficult to bond these surfaces to metals, especially in those instances in which the adhesively bound surfaces are subjected to fuels, oils and other organic solvents.

Accordingly, it is an object of the present invention to provide methods for effectively adhesively bonding metal to rubber surfaces. It is an even more especially preferred object to provide a method for bonding fluorosilicone rubbers to a variety of metallurgies including, stainless steel, mild steel, brass, and aluminum.

SUMMARY OF THE INVENTION

These and other objects are met by the instant invention. Effective adherence of rubber, especially flourosilicone rubbers, to a variety of metal surface has been shown by use of an adhesive treatment comprising (I) an organofunctional silane and (II) a non-organofunctional silane.

The silanes (I) and (II) are partially hydrolyzed by addition thereof to an acidic aqueous or alcoholic medium. Solutions or dispersions of the silanes (I) and (II) are then applied to the requisite rubber or metal surface by dip coating, spraying, roller coating etc. After application of adhesive treatment to the surfaces, the surfaces may be blow dried or heated.

Although emphasis has been placed on effective adhesive bonding of fluorosilicone rubbers to a variety of metal surfaces, the adhesive treatment may also be used in conjunction with other rubber types such as EPDM, fluorocare rubber, and vinyl methyl silicone rubber. Tested metals with which the adhesive treatment has demonstrated efficacy include brass, stainless and mild steel and aluminum.

The invention will now be more specifically described in the following detailed description.

DETAILED DESCRIPTION OF THE PREFERRED EMBODIMENT

The adhesive treatment of the invention comprises use of an organofunctional silane (I) and a non-organofunctional silane (II).

I. Organofunctional Silane

This is a substituted silane compound having at least one free organofunctional moiety attached to an Si atom wherein the organofunctional moiety is adapted to react with the rubber substrate. More preferably, the organofunctional moiety is attached to one end of the Si atom with the remaining Si valences bonded to groups selected from $C_1$–$C_6$ alkoxy or acetoxy. More particularly, suitable organofunctional silane compounds can be represented by the formula

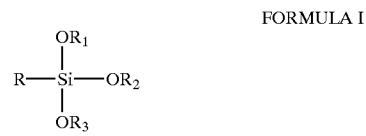

FORMULA I wherein R is chosen from amino, $C_1$–$C_6$ alkylamino, vinyl, ureido, ureido substituted $C_1$–$C_6$ alkyl, epoxy, epoxy substituted $C_1$–$C_6$ alkyl, mercapto, mercapto substituted $C_1$–$C_6$ alkyl, cyanato, cyanato subsituted $C_1$–$C_6$ alkyl, methacrylato, methacrylato substituted $C_1$–$C_6$ alkyl, and vinyl benzyl moieties. The most preferred R substituent is vinyl. $R_1$, $R_2$, and $R_3$ are independently selected from $C_1$–$C_6$ alkyl and acetyl groups.

Exemplary organofunctional compounds include γ-aminopropyltriethoxysilane (γ-APS); γ-mercaptopropyltrimethoxysilane (γ-MPS); γ-ureidopropyltrialkoxysilanes (γ-UPS); γ-glycidoxypropyltrimethoxysilane (γ-GPS); and a host of vinyl silanes (wherein R is vinyl). Most preferred are vinyltrimethoxysilane, vinyltriethoxysilane and vinyltriacetoxysilane with vinyltrimethoxysilane (VS) most preferred.

II. Non-Organofunctional Silane

These are substituted silane compounds wherein one or a plurality of the Si valences are bonded to $C_1$–$C_6$ alkoxy and/or acetoxy groups. These may be represented by the formula II

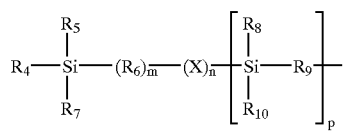

wherein m is 0 or 1; n is 0 or 1; and p is 0 or 1; with $R_4$ selected from an aliphatic (saturated or unsaturated) group;

aromatic group, or $C_1$–$C_6$ alkoxy or acetoxy; $R_5$, $R_6$, $R_7$, $R_8$, $R_9$, and $R_{10}$ may be the same or different and are chosen from $C_1$–$C_6$ alkoxy, H, or acetoxy; X, when present, is alkylene, alkenylene, phenylene or amino.

Exemplary non-organofunctional silanes include methyltrimethoxysilane (MS); propyltrimethoxysilane (PS); 1,2bis(triethoxysilyl)ethane (BTSE); bis(methyl diethoxysilyl)ethane (BDMSE); 1,2-bis(trimethoxysilyl)ethane (TMSE); 1,6-bis(trialkoxysilyl)hexanes; 1,2-bis-(triethoxysilyl)ethene; and 1,2-bis-(timethoxysilyipropyl) amine. Preferred are BTSE and BDMSE with BTSE most preferred.

The non-organofunctional silanes (I) and the non-organofunctional silanes (II) are both partially hydrolyzed by addition thereto into an aqueous/alcoholic solution including preferably a 40/60 vol % mix of ethanol/water. The silanes are added in an amount by volume of 0.5–10% based on the volume of the aqueous/alcoholic solution. Preferably, the silanes are present in an amount by volume of from about 1–5 vol %. Optimal adhesion has been shown when the pH of the solution is adjusted to between about 1–7. Most preferred is a pH of about 4.

The hydrolyzation of the silanes I and II is dependent on the pH of the solution. For example, acetic acid, oxalic acid and phosphoric acid may be mentioned as exemplary pH adjustment agents. Based on presently available data, it is preferred to use acetic acid as the pH adjustment agent.

Preliminary results indicate that the solution should be an ethanol/water solution with a 40/60 ethanol:water volumetric ratio being presently preferred.

The intended interfacial surfaces of the metal to rubber parts are contacted by the silanes (I) and (II) by dipping, spraying, painting etc. The following procedures were tried and found effective:

(1) blow drying—the metal parts are dipped in the silane solution for at least 30 s and then are blown dry by filtered air;

(2) air drying—the metal parts are dipped into the silane solution for at least 30 s and are allowed to dry for at least 30 min in the air;

(3) prebaking—the metal parts are dipped into the silane solution for at least 30 s and then dried in an air circulated oven for 20 min at 120° C.;

(4) spraying—the silane solution was sprayed on the metal parts and the parts were blown dry by filtered air; and (5) preheated spraying—the silane solution was sprayed onto the metal parts which were then preheated in an air circulated oven for 20 min and then blown dry by filtered air. In those situations in which brass metallurgy is to be adhesively bound to desired rubber, the blow drying and spraying techniques appear optimal.

When brass and fluorosilicone substrates are to be bonded, a mixture of VS and BTSE should be used in a single layer approach. A mixture of 3% VS and 2% BTSE in EtOH/$H_2O$ appears optimal in this situation.

Surprisingly it was found that a two step or two layer coating system appeared optimal for Al, SS and MS metals. That is, a first layer of non-organofunctional silane (II) is applied to the metal surface. Then, the organofunctional silane (I) is applied over the first layer as a second layer. This second layer consisting of the organofunctional silane (I) is placed adjacent the rubber surface for effective bonding. Of course the second layer could be placed over the rubber substrate with the metal and rubber surfaces then placed together and pressed to effect bonding.

Although applicants are not to be bound by any particular theory of operation, it is thought that the available organofunctional moiety on the silane effectively cross links with the rubber, probably to diene functions along the rubber macromolecule.

Based upon presently available data, the two step approach is preferred for Al, SS, and MS—rubber adhesion. The first layer solution should be 1% BTSE at pH 4 with the second layer solution being a VS 5% solution at pH 4. For brass, a single layer mixture of VS and BTSE is presently preferred. Both the VS and BTSE are commercially available from Witco's Organosilicone group in Tarrytown, N.Y.

Although the present research indicates that the adhesive treatments of the present invention are effective for peroxide cured rubbers, it is thought that the invention shall also function for other curing systems such as nitro, quinone, azo, S, Se, bisphenol, diamine, Pt and Te curing systems.

Additional research has also shown that sandwiches of silicon wafers and siloxane rubber can be joined with the two step process and that these joints can successfully withstand etching with a 50% KOH solution at 80° C.

EXAMPLES

In order to assess the efficacy of the silane adhesive treatments of the present invention in bonding metal to rubber surfaces, a series of tests were performed with test specimens as set forth in the ISO 5600 standard test except that the actual dimensions of the parts were slightly modified in order to make the tests more economical.

In accordance with the ISO 5600 procedure, the test piece is composed of two conical ends of a rigid material (or here, metal), joined by a cylinder of rubber. The rigid material comprises a pair of metal insert parts: each containing a conical end and an oposed cylindrical end. The diameter of the cylindrical ends is 12.5 mm, while the half angle of the conical vertex is 45°. The two conical ends of the inserts are spaced apart from each other with the cylindrical rubber material provided, at its oposed longitudinal ends, with "V" shaped concavitities; each adapted to mate with a conical end of one of the rigid inserts. The insert-rubber-insert combination is aligned so that a space of about 6 mm separates the tip end of one conical insert from the tip end of the other.

The test adhesives are applied along the interfacial surfaces of each of the "V" shaped concavities of the rubber material and the conical ends of the inserts. The so formed test rubber pieces are vulcanized in a suitable transfer mould for 6 minutes at 170° C. under a clamp pressure of 60 bar. The test pieces were then postcured for 7 h at 200° C.

The alloys used in the studies were as follows:

| | Tested metal alloys | | |
|---|---|---|---|
| Metal Code | Metal | Alloy | Pre-treatment |
| SS | Stainless Steel | X12CrMoS17 (AISI430F) | alkaline |
| MS | Mild Steel | 9SMn36 | degreased |
| AL | Aluminium | AlSiMgl | alkaline |
| Br | Brass | CuZn39Pb3 | acidic |

The above Table also shows the metal pre-treatments used in this research. The aluminum and stainless steel parts were cleaned ultrasonically in a Sonotron-solution of 5% in distilled water (pH10) for 10 minutes at 50° C. Sonotron is a commerical alkaline cleaner obtained from Rogier Bosman Chemie B. V. (The Netherlands). Afterwards the samples were rinsed thoroughly with distilled water and immediately dipped in the silane solution. The brass parts were cleaned ultrasonically in a Deoxidine-solution of 5% in distilled water (pH1) for 10 minutes at room temperature. Deoxidine is a commercial acidic cleaner obtained from Mavom B. V. (The Netherlands). This was found to be the best pretreatment procedure for brass. Afterwards the samples were thoroughly rinsed with distilled water and immediately dipped in the silane solution. Finally the mild steel parts were ultrasonically degreased in a 50/50% mixture of acetone and ethanol, rinsed in ethanol and dipped into the silane solution. Cleaning with the commercial aqueous systems caused immediately corrosion of the mild steel parts.

After cleaning, the metal parts were dipped for at least 30 s in the silane coupling agent solutions and blown dry by air. In some experiments the metal parts were dipped in a second solution for at least 30 s, immediately after drying, and blown dry by air. In other experiments the parts were dried in an oven for 20 min at 120° C. or just air dried. Further in some cases sodium silicate (10% solution; Fisher Chemicals (USA)) was applied followed by dipping in a silane solution.

Adhesive efficacy was tested by an Instron tensometer at a constant crosshead speed of 2 inch/min. The maximum force [N] for failure of the test parts and the rubber retention [%R]—(100% rubber retention means complete failure of the test parts in the rubber phase) were measured and recorded. Reported results use the average of three tests.

Prior to testing of the bond strength at least 16 h conditioning at room temperature was allowed. Three tests parts of every four runs were used for initial tests and six parts for the aging tests. The tests were carried out as described above.

In some cases, the test parts were "aged." For these studies, test parts were immersed in a mixture of 85% ASTM reference fuel C, a 50/50% blend of toluene and isooctane, and 15% methanol. Addition of 15–25% of methanol is known to cause the highest property loss and volume swell for fluorosilicone parts. The fuel tests were carried out with stainless steel chambers which were filled with the fuel mixture and sealed off with a Viton® O-ring. The chambers were put in an oven for 70 h at 60° C. After 70 h the stainless steel chambers were taken out off the oven and some test parts were allowed to cool down to reach room temperature, still soaked in the fuel. After this cool down period, the test pieces were taken out of the, fuel, dried with a tissue and immediately tested to avoid evaporation of the fuel. Other parts, after the fuel soak, were put in an oven for 24 h at 100° C. to evaporate the fuel and tested.

Results 1.0 Effect of Silane Coupling Agents on Bonding Strength

Tables 1 and 2 show the effect of various silanes by themselves on the adhesion strength for aluminum and brass. As references the cleaned metal parts (no adhesive layer) and sodium silicate were used.

TABLE 1

Silane coupling agents for bonding of fluorosilicone rubber to aluminum (parts dipped in solution in 40% ethanol/60% water mixture (only MS and PS applied in 80% ethanol/20% water mixture) of 5 vol % at pH 4)

| Type of silane | Maximum Force [N] | Rubber Retention [% R] |
|---|---|---|
| none | 40 | 0 |
| Sodium Silicate | 99 | 0 |
| MS | 26 | 0 |
| VS | 295 | 100 |
| BTSE | 308 | 100 |

TABLE 1-continued

Silane coupling agents for bonding of fluorosilicone rubber to aluminum (parts dipped in solution in 40% ethanol/60% water mixture (only MS and PS applied in 80% ethanol/20% water mixture) of 5 vol % at pH 4)

| Type of silane | Maximum Force [N] | Rubber Retention [% R] |
|---|---|---|
| BDMSE | 216 | 65 |
| PS | 168 | 50 |

TABLE 2

Silane coupling agents for bonding of fluorosilicone rubber to brass (parts dipped in solution of 5 vol % in 40% ethanol/water mixture at pH 4)

| Type of silane | Maximum Force [N] | Rubber Retention [% R] |
|---|---|---|
| none | 47 | 0 |
| Sodium Silicate | 55 | 0 |
| MS | 76 | 0 |
| VS | 281 | 100 |
| BTSE | 214 | 25 |
| BDMSE | 230 | 55 |

MS = methyltrimethoxysilane
VS = vinyltrimethoxysilane
BTSE = 1,2 bis (triethoxysilyl) ethane
BDMSE = Bis (methyldiethoxysilyl) ethane
PS = n-propyltrimethoxysilane From Tables 1 and 2 it is clear that silane coupling agents by themselves are useful for bonding of fluorosilicone rubber to metals.

A sodium silicate-layer does not have any organofunctionality. Therefore during the vulcanization of rubber no bonds can be formed across the silicate-rubber interface. This co-vulcanization did not take place when methyltriethoxysilane was used. Vinyl moieties are known for their reactivity during vulcanization and therefore the adhesion improved radically when vinyltrimethoxysilane was used.

Further it was surprising that BTSE, BDMSE and n-propyltrimethoxysilane, known as non-functional silanes, were able, to a certain extent, to bond fluorosilicone rubber to metals.

2.0 Adhesion Using Mixed Silane Coupling Agents

The adhesive efficacy of mixtures of VS and BTSE was assessed along with mixtures of PS and MS with VS.

Table 3 shows the results of different mixtures of VS and BTSE on the adhesion of fluorosilicone rubber to brass.

TABLE 3

Influence of the ratio of VS and BTSE on the adhesion of metals to fluorosilicone with a mixture of VS and BTSE (solution in 40% ethanol/water mixture with pH 4; VS and BTSE were added in the given vol %)

| Mixture VS + BTSE | Aluminum | | Stainless Steel | | Mild Steel | |
|---|---|---|---|---|---|---|
| 5% + 0%[a] | 295[b] | 100[c] | 289 | 100 | 305 | 100 |
| 3% + 2% | 296 | 100 | 286 | 100 | 291 | 100 |
| 5% + 1% | 303 | 100 | 293 | 85 | 303 | 100 |
| 5% + 2% | 301 | 100 | 285 | 95 | 307 | 100 |
| 5% + 5% | 286 | 95 | 291 | 95 | 306 | 100 |
| 0% + 5% | 308 | 100 | 285 | 100 | 297 | 100 |

[a]VS [vol %] + BTSE [vol %]
[b]Maximum Force [N]
[c]Rubber Retention [% R]

TABLE 4

Mixtures of MS and PS with VS (solution in 40% ethanol/water mixture with pH 4) for aluminum - FVMQ adhesion

| Silane mixture | Initial | | Fuel | | Dry-Out | |
|---|---|---|---|---|---|---|
| 3% VS + 2% PS | 282[a] | 100[b] | 114 | 95 | 294 | 95 |
| 3% VS + 2% MS | 298 | 100 | 115 | 100 | 302 | 100 |

[a]Maximum Force [N]
[b]Rubber Retention [% R]

These results demonstrate that by adding VS, interfacial bonds are formed during the vulcanization of the rubber. FVMQ=fluorinated, vinyl methyl silicone rubber 3.0 Two Step Process Not always a nice homogeneously layer is obtained when a silane is applied to a substrate. Surface wetting and chemistry can lead to deficiencies in the silane layer and disorientation of the silane at the substrate interface. This phenomena has been demonstrated for y-aminopropylsilane. The amino group could be oriented towards the substrate or from the substrate depending on the pH. Therefore it could be beneficial to apply first a layer of a silane which shows strong interaction with the substrate forming thus a homogeneous and a dense layer on the substrate followed by applying a silane which adheres very well to the first silane layer and which will be oriented in the right direction. In this way good adhesion can be obtained between two substrates.

Bis-(trimethoxysilyl)ethane has twice as many silanol groups as other commonly used silanes. BTSE has six silanol groups when it is completely hydrolyzed and more common silanes have three silanol groups. Therefore BTSE should react readily with the hydroxyl groups on the metal surface forming a homogeneously and dense layer.

In these experiments a variety of two layer systems was compared. The performance of BTSE as first layer was compared with BDMSE which has only four silanol groups when it is completely hydrolyzed, and with sodium silicate. Concentration and pH were varied. In all cases vinyltrimethoxysilane was applied as second layer at a concentration of 1% or 5% with pH4.

TABLE 5

Fluorosilicone elastomer bonded to aluminum with a variety of two step processes

| Two Step Process | Maximum Force [N] | Rubber Retention [% R] |
|---|---|---|
| BTSE (1%) pH 4 + VS (5%) pH 4 | 294[a] | 100[b] |
| BTSE (1%) pH 7 + VS (1%) pH 4 | 231 | 40 |
| BTSE (1%) pH 7 + VS (5%) pH 4 | 276 | 95 |
| BTSE (5%) pH 4 + VS (5%) pH 4 | 282 | 95 |
| BTSE (5%) pH 5 + VS (5%) pH 4 | 294 | 100 |
| BTSE (5%) pH 6 + VS (5%) pH 4 | 294 | 100 |
| BTSE (5%) pH 7 + VS (5%) pH 4 | 280 | 100 |
| BTSE (5%) pH 7 + VS (1%) pH 4 | 279 | 100 |
| BDMSE (5%) pH 4 + VS (5%) pH 4 | 314 | 100 |
| Silicate (10%) pH 11 + VS (5%) pH 4 | 308 | 100 |

[a]Maximum Force [N]
[b]Rubber Retention [% R]

For aluminum all two step processes gave 100% rubber retention (Table 5) except the two layer system of BTSE (1%) pH7 and VS (1%) pH4.

The results in Table 6 show that for the majority of the two step processes 100% rubber retention can be obtained for stainless steel. Only applying BTSE from a 5% solution with pH7 decreases the adhesion.

TABLE 6

Fluorosilicone elastomer bonded to stainless steel with a variety of two step processes.

| Two Step Process | Maximum Force [N] | Rubber Retention [% R] |
|---|---|---|
| BTSE (1%) pH 4 + VS (5%) pH 4 | 294[a] | 100[b] |
| BTSE (1%) pH 7 + VS (1%) pH 4 | 294 | 100 |
| BTSE (1%) pH 7 + VS (5%) pH 4 | 288 | 100 |
| BTSE (5%) pH 4 + VS (5%) pH 4 | 291 | 100 |
| BTSE (5%) pH 5 + VS (5%) pH 4 | 284 | 95 |
| BTSE (5%) pH 6 + VS (5%) pH 4 | 291 | 95 |
| BTSE (5%) pH 7 + VS (5%) pH 4 | 216 | 15 |
| BTSE (5%) pH 7 + VS (1%) pH 4 | 162 | 15 |
| BDMSE (5%) pH 4 + VS (5%) pH 4 | 327 | 100 |
| Silicate (10%) pH 11 + VS (5%) pH 4 | 298 | 80 |

[a]Maximum Force [N]
[b]Rubber Retention [% R]

TABLE 7

Fluorosilicone elastomer bonded to mild steel with a variety of two step processes

| Two Step Process | Maximum Force [N] | Rubber Retention [% R] |
|---|---|---|
| BTSE (1%) pH 4 + VS (5%) pH 4 | 303[a] | 100[b] |
| BTSE (1%) pH 7 + VS (5%) pH 4 | 295 | 100 |
| BTSE (5%) pH 4 + VS (5%) pH 4 | 283 | 95 |
| BTSE (5%) pH 5 + VS (5%) pH 4 | 296 | 100 |
| BTSE (5%) pH 6 + VS (5%) pH 4 | 271 | 55 |
| BTSE (5%) pH 7 + VS (5%) pH 4 | 282 | 75 |
| BTSE (5%) pH 7 + VS (1%) pH 4 | 228 | 45 |
| BDMSE (5%) pH 4 + VS (5%) pH 4 | 254 | 25 |
| Silicate (10%) pH 11 + VS (5%) pH 4 | 232 | 15 |

[a]Maximum Force [N]
[b]Rubber Retention [% R]

For brass 100% rubber retention was only obtained with BTSE (5%) pH4 and VS (5%) pH4 (Table 8). Brass surfaces look to be very sensitive to applying conditions and the solutions have to be fine tuned.

TABLE 8

Fluorosilicone elastomer bonded to brass with a variety of two step processes

| Two Step Process | Maximum Force [N] | Rubber Retention [% R] |
|---|---|---|
| BTSE (1%) pH 4 + VS (5%) pH 4 | 234[a] | 30[b] |
| BTSE (1%) pH 7 + VS (1%) pH 4 | 291 | 75 |
| BTSE (1%) pH 7 + VS (1%) pH 4 | 266 | 65 |
| BTSE (1%) pH 7 + VS (5%) pH 4 | 241 | 40 |
| BTSE (5%) pH 4 + VS (5%) pH 4 | 287 | 100 |
| BTSE (5%) pH 5 + VS (5%) pH 4 | 247 | 65 |
| BTSE (5%) pH 6 + VS (5%) pH 4 | 119 | 20 |
| BTSE (5%) pH 7 + VS (5%) pH 4 | 262 | 70 |
| BTSE (5%) pH 7 + VS (1%) pH 4 | 197 | 20 |
| BDMSE (5%) pH 4 + VS (5%) pH 4 | 242 | 15 |
| Silicate (10%) pH 11 + VS (5%) pH 4 | 211 | 15 |

[a]Maximum Force [N]
[b]Rubber Retention [% R]

4.0 Aging Tests

It is important that the adhesive agents should endure a 70 h test in a mixture of 85% ASTM reference fuel C, a 50/50% blend of toluene and isooctane, and 15% methanol. Not only the rubber will be affected by the fuel mixture but also the silane coupling agent layer and the interfaces. The stress at those interfaces and in the silane layer will be increased during swelling of the elastomer. The resistance of the layer against the fuel will be determined by the layer thickness, the (crosslink) density of the layer, the interactions between the silane and the metal substrate on one side and the interaction of the silane with the elastomer on the other side.

A possible loss in adhesion will maybe not be observed after immersion of the test parts in the fuel. The rubber is then completely swollen and the strength of the rubber is decreased. However, after dry out and evaporation of the solvents the rubber will regain its strength back and a possible loss in adhesion will be observed. In tests involving aluminum to FVMQ, after fuel swell and after dry out 100% rubber retention is obtained. The adhesion is not affected by the aging test. The rubber strength is affected as can be seen from the decrease (two thirds) of the maximum force for failure after immersion in the fuel. After dry-out, the rubber regained its strength back and the maximum force is close to the initial force for failure.

100% rubber retention is obtained initially and after fuel swell for adhesion of brass to FVMQ using a two step process of BTSE (5% at pH4) and VS (5% at pH4). However, after dry-out a substantial decreased is observed in rubber retention suggesting that the adhesion is affected by the fuel immersion and the dry-out process.

In Tables 9–12 the results are given for the adhesion of the four tested metals to FVMQ using a variety of silane treatments. With aluminum the best results were obtained and for almost all silane treatments 100% rubber retention was obtained after aging.

TABLE 9

Adhesion properties after aging test for aluminum bonded to FVMQ

| Type of Silane Layer | Initial | | Fuel Test | | Dry-Out Test | |
|---|---|---|---|---|---|---|
| VS (1%) pH 4 | 277[a] | 100[b] | 99 | 100 | 289 | 95 |
| VS (5%) pH 4 | 295 | 100 | 96 | 100 | 284 | 90 |
| BTSE (5%) pH 4 | 308 | 100 | 92 | 100 | 268 | 100 |
| Mixture VS + BTSE (3% + 2%) pH 4 | 296 | 100 | 99 | 100 | 285 | 100 |
| BTSE (1%) pH 4 + VS (5%) pH 4 | 294 | 100 | 99 | 100 | 275 | 100 |
| BTSE (1%) pH 7 + VS (1%) pH 4 | 231 | 40 | 96 | 100 | 267 | 70 |
| BTSE (1%) pH 7 + VS (5%) pH 4 | 276 | 95 | 98 | 100 | 289 | 100 |
| BTSE (5%) pH 4 + VS (5%) pH 4 | 282 | 95 | 94 | 100 | 270 | 100 |
| BTSE (5%) pH 7 + VS (1%) pH 4 | 279 | 100 | 99 | 100 | 291 | 100 |
| BTSE (5%) pH 7 + VS (5%) pH 4 | 280 | 100 | 96 | 100 | 287 | 85 |
| BDMSE (5%) pH 4 + VS (5%) pH 4 | 314 | 100 | 99 | 100 | 282 | 100 |
| Silicate (10%) pH 11 + VS (5%) pH 4 | 308 | 100 | 98 | 100 | 279 | 90 |

[a]Maximum Force [N]
[b]Rubber Retention [% R]

Initial results were for stainless steel also good for a variety of silane treatments. However, after fuel immersion and dry-out adhesion dropped for a number of treatments suggesting that the adhesion with these silane treatments was affected by the fuel aging. For three two step processes 100% rubber retention was obtained:

BTSE (1%) pH4+VS (5%) pH4
BTSE (1%) pH7+VS (5%) pH4
BDMSE (5%) pH4+VS (5%) pH4

TABLE 10

Adhesion properties after aging test for stainless steel bonded to FVMQ

| Type of Silane Layer | Initial | | Fuel Test | | Dry-Out Test | |
|---|---|---|---|---|---|---|
| VS (1%) pH 4 | 285[a] | 95[b] | 69 | 25 | 154 | 0 |
| VS (5%) pH 4 | 289 | 100 | 102 | 100 | 241 | 75 |
| BTSE (5%) pH 4 | 285 | 100 | 68 | 40 | 199 | 5 |
| Mixture VS + BTSE (3% + 2%) pH 4 | 286 | 100 | 100 | 75 | 237 | 75 |
| BTSE (1%) pH 4 + VS (5%) pH 4 | 294 | 100 | 98 | 100 | 285 | 100 |
| BTSE (1%) pH 7 + VS (1%) pH 4 | 294 | 100 | 101 | 100 | 240 | 60 |
| BTSE (1%) pH 7 + VS (5%) pH 4 | 288 | 100 | 103 | 100 | 271 | 95 |
| BTSE (5%) pH 4 + VS (5%) pH 4 | 291 | 100 | 91 | 80 | 223 | 45 |
| BTSE (5%) pH 7 + VS (1%) pH 4 | 162 | 15 | 52 | 75 | 125 | 0 |
| BTSE (5%) pH 7 + VS (5%) pH 4 | 216 | 15 | 99 | 75 | 186 | 20 |
| BDMSE (5%) pH 4 + VS (5%) pH 4 | 327 | 100 | 100 | 100 | 277 | 100 |
| Silicate (10%) pH 11 + VS (5%) pH 4 | 298 | 80 | 96 | 100 | 270 | 80 |

[a]Maximum Force [N]
[b]Rubber Retention [% R]

In case of mild steel applying first a silane of BTSE from a 1% solution followed by a vinylsilane layer from a 5% solution resulted in 100% rubber retention. However, with the one step processes of only vinylsilane and a mixture of VS and BTSE also good results were obtained.

TABLE 11

Adhesion properties after aging test for mild steel bonded to FVMQ

| Type of Silane Layer | Initial | | Fuel Test | | Dry-Out Test | |
|---|---|---|---|---|---|---|
| VS (1%) pH 4 | 237[a] | 0[b] | 77 | 35 | 168 | 0 |
| VS (5%) pH 4 | 305 | 100 | 98 | 100 | 272 | 100 |
| BTSE (5%) pH 4 | 297 | 100 | 96 | 100 | 219 | 10 |
| Mixture VS + BTSE (3% + 2%) pH 4 | 291 | 100 | 97 | 100 | 274 | 85 |
| BTSE (1%) pH 4 + VS (5%) pH 4 | 303 | 100 | 98 | 100 | 285 | 100 |
| BTSE (1%) pH 7 + VS (1%) pH 4 | 291 | 75 | 96 | 100 | 238 | 40 |
| BTSE (1%) pH 7 + VS (5%) pH 4 | 295 | 100 | 98 | 100 | 274 | 90 |
| BTSE (5%) pH 4 + VS (5%) pH 4 | 283 | 95 | 96 | 65 | 249 | 65 |
| BTSE (5%) pH 7 + VS (1%) pH 4 | 228 | 45 | 92 | 75 | 210 | 5 |
| BTSE (5%) pH 7 + VS (5%) pH 4 | 282 | 75 | 100 | 100 | 228 | 30 |
| BDMSE (5%) pH 4 + VS (5%) pH 4 | 254 | 25 | 93 | 65 | 253 | 35 |
| Silicate (10%) pH 11 + VS (5%) pH 4 | 232 | 15 | 99 | 75 | 210 | 15 |

[a]Maximum Force [N]
[b]Rubber Retention [% R]

Aluminum is very easy to bond to FVMQ using silanes. Brass is most difficult to bond to FVMQ. Best results were obtained for a mixture of 3% VS and 2% BTSE. Similar results were obtained with these solutions. With only vinylsilane also reasonable adhesion was obtained.

TABLE 12

Adhesion properties after aging test for brass bonded to FVMQ

| Type of Silane Layer | Initial | | Fuel Test | | Dry-Out Test | |
|---|---|---|---|---|---|---|
| VS (1%) pH 4 | 283[a] | 90[b] | 94 | 100 | 222 | 5 |
| VS (5%) pH 4 | 281 | 100 | 96 | 100 | 272 | 65 |
| BTSE (5%) pH 4 | 214 | 25 | 89 | 90 | 200 | 35 |
| Mixture VS + BTSE (3% + 2%) pH 4 | 308 | 95 | 90 | 100 | 269 | 90 |
| BTSE (1%) pH 4 + VS (5%) pH 4 | 234 | 30 | 99 | 100 | 199 | 20 |
| BTSE (1%) pH 7 + VS (1%) pH 4 | 266 | 65 | 93 | 100 | 207 | 15 |
| BTSE (1%) pH 7 + VS (5%) pH 4 | 241 | 40 | 92 | 100 | 227 | 25 |
| BTSE (5%) pH 4 + VS (5%) pH 4 | 287 | 100 | 89 | 100 | 197 | 40 |
| BTSE (5%) pH 7 + VS (1%) pH 4 | 197 | 20 | 78 | 75 | 115 | 0 |
| BTSE (5%) pH 7 + VS (5%) pH 4 | 262 | 70 | 88 | 95 | 197 | 15 |
| BDMSE (5%) pH 4 + VS (5%) pH 4 | 242 | 15 | 84 | 65 | 230 | 15 |
| Silicate (10%) pH 11 + VS (5%) pH 4 | 211 | 15 | 85 | 55 | 193 | 10 |

[a]Maximum Force [N]
[b]Rubber Retention [% R]
[c]Only the fuel test results of the 3:2 mixture is listed in this table.

Generally the following can be concluded from the aging test results:

Aluminum is easy to bond and the formed bond is not sensitive to a fuel environment.

Brass is more difficult to bond and best results were obtained with a mixture of VS and BTSE For stainless Steel and mild Steel with one specific two step process (BTSE-1% (pH4) and VS-5% (pH4)) 100% rubber retention was obtained.

If one has to select a general silane treatment for aluminum, stainless steel and mild steel the two step process of BTSE-1% (pH4) and VS-5% (pH4) would be the best process.

Immersion in fuel decreases the maximum force for failure at 100% rubber retention with two third.

After dry-out the maximum force for failure is comparable with the initially measured force. Some silane layers in combination with a type of metal are very sensitive to this aging test. This is probably due to differences in silane layer thickness, the (crosslink) density of the layer, the interactions between the silane and the metal substrate on one side and the interaction of the silane with the elastomer on the other side. On aluminum a nice homogeneous and dense layer with good interactions with the metal surface can be easily obtained.

5.0 Adhesive Tests with Other Elastomers

Several silane solutions were also evaluated on the ability to adhere other elastomer types to stainless steel and aluminum:

EPDM: Ethylene Propylene Diene Rubber

VMQ: Vinyl Methyl Silicone Rubber

FKM: Fluorocarbon Rubber

Molding of the Rubber-metal Test Parts

The rubber-metal test parts were prepared by hot transfer molding at a vulcanization temperature of 170° C. for the silicone compounds. The EPDM and FKM compounds were molded at a temperature of 185° C. For all compounds the vulcanization time was set at 6 min and the ram pressure was 60 bars. After molding the test pieces were post cured for variable amounts of time depending on the elastomer type to stabilize final properties and to remove volatile peroxide decomposition products:

Silicone test parts 4 h @ 200° C.

Fluorocarbon test parts 7 h @ 230° C.

EPDM test parts no post cure

Aging Tests Fluorocarbon Test Parts

The same procedure was followed as described for the fluorosilicone parts. Only the parts were soaked in Fuel C without addition of methanol and the aging temperature was 70° C. instead of 60° C.

Durability Tests EPDM Test Parts

Some EPDM test parts were immersed in a 50/50% ethylene glycol and distilled water mixture. This system was heated to 135° C. under an over-pressure of 2.5 bar in an autoclave. The test pieces were subjected to this environment for 22 h. The parts were cooled to room temperature and tested as described above. Other test parts were subjected to either a solution of 50 mM citric acid (pH3) or a 3%-NaOH solution for 22 h at refluxing temperature.

Durability Tests Silicone Test Parts

The same procedure was followed as described for the EPDM parts. Only the parts were immersed in distilled water.

Results and Discussion

Table 13 shows the results when EPDM is adhered to stainless steel and aluminum using silane coupling agents. The performance of only VS, a mixture of VS and BTSE and the two step process using first a layer of BTSE either applied from a 1% or a 5% solution were compared before and after an autoclave test. For stainless steel all the tested silane systems were giving about 100% rubber retention before and after autoclave testing. For aluminum the two step processes showed initially 100% rubber retention but after autoclave there is hardly any difference between the systems (about 70% rubber retention). The aluminum looked affected by the water/glycol environment. This environment is slightly acidic (pH5) and the aluminum pars are possibly affected by this environment.

TABLE 13

Adhesion of EPDM to stainless steel and aluminum using silane coupling agents

| Metal | VS (5%) | | BTSE (1%) + VS (5%) | | BTSE (5%) + VS (5%) | | Mixture VS + BTSE (3% + 2%) | |
|---|---|---|---|---|---|---|---|---|
| Stainless Steel (before autoclave) | 560[a] | 100[b] | 569 | 100 | 576 | 100 | 556 | 100 |
| Stainless Steel (after autoclave) | 523 | 95 | 538 | 100 | 544 | 100 | 530 | 90 |
| Aluminum (before autoclave) | 538 | 70 | 554 | 100 | 572 | 100 | 503 | 75 |
| Aluminum (after autoclave) | 494 | 70 | 493 | 75 | 448 | 60 | 506 | 75 |

[a]Maximum Force [N]
[b]Rubber Retention [% R]

Table 14 gives results of durability tests in other environments. Especially the results in the 3%-NaOH solution are remarkable because this is a very severe environment. In the citric acid environment both the rubber and the stainless steel parts seemed attacked but the adhesion was unaffected (citric acid solution was colored black with the EPDM and the metal parts looked corroded).

TABLE 14

Durability of EPDM to stainless steel joints using a two step process (BTSE-1% pH 4) and VS-5% pH 4))

| Test environment[a] | Maximum Force for failure [N] | Rubber retention [% R] |
|---|---|---|
| 50 mM Citric acid (pH3) | 508 | 100 |
| 3%-NaOH | 505 | 80 |

[a]Tested for 22 h at refluxing temperature ± (100° C.)

Two types of FKM compounds were tested. These compounds differ significantly in rheologic properties (see Table 15). With compound FKM-1 problems arose with processing of the compound. Therefore mold filling was not optimal and adhesion was negatively influenced. Only 20% rubber retention was obtained.

TABLE 15

Adhesion of FKM to stainless steel using silane coupling agents

| Type of FKM | VS (5%) | | BTSE (1%) + VS (5%) | | Mixture VS + BTSE (3% + 2%) | |
|---|---|---|---|---|---|---|
| FKM-1 (before fuel) | 340[a] | 20[b] | 332 | 25 | 396 | 30 |
| FKM-2 (before fuel) | 360 | 100 | 286 | 100 | | |
| FKM-2 (after fuel) | 246 | 90 | 307 | 95 | | |
| FKM-2 (after dry-out) | 244 | 100 | 310 | 95 | | |

[a]Maximum Force [N]
[b]Rubber Retention [% R]

Compound FKM-2 processed very well and good results were obtained with VS and the two layer system. Even after fuel soak and dry out 100% rubber retention was obtained.

TABLE 16

Adhesion of VMQ to stainless steel using silane coupling agents

| Type of VMQ | VS (5%) | | BTSE (1%) + VS (5%) | | Mixture VS + BTSE (3% + 2%) | |
|---|---|---|---|---|---|---|
| VMQ-1 (before autoclave) | 179[a] | 100[b] | 178 | 100 | 182 | 100 |
| VMQ-2 (before autoclave) | 248 | 100 | 239 | 100 | | |
| VMQ-2 (after autoclave | 217 | 100 | 218 | | | |

[a]Maximum Force [N]
[b]Rubber Retention [% R]

Table 16 shows the results for the siloxane compounds. In case of VMQ-1 failure occurs for 100% in the bulk of the rubber. In case of VMQ-2 failure occurs not in the bulk of the rubber but in a layer very close to the silane layer. SEM photographs show the failure pattern for VMQ-2. It is clear that failure has occurred in the rubber phase. Closer observations of the failure surface showed only a few minor cracks in the rubber layer. EDX-analysis learned that the metal surface could be seen in these cracks but that the metal was covered with the silane coupling agent layer and probably also siloxane rubber. On basis of the SEM-analysis it was determined that failure took place for 100% in the rubber phase.

6.0 Replacement of Vinyltrimethoxysilane by Vinyltriethoxysilane

One disadvantage of vinyltrimethoxysilane is that in contact with water, methanol can be formed. When vinyltriethoxysilane would be used this problem would be solved.

Table 17 shows the results of vinyltriethoxysilane. This silane needs more hydrolysis time and in the presolution about 60% ethanol is needed to solve the silane well in water. After hydrolysis the presolution can be adjusted to the desired concentration of silane and ethanol.

TABLE 17

Adhesion of FVMQ to stainless steel and aluminum using vinyltriethoxysilane and BTSE (pH 4)

| One or two step | metal | Initial | | Fuel | | Dry-Out | |
|---|---|---|---|---|---|---|---|
| VS-ethoxy 5% | stainless steel | 261 | 75 | | | | |
| BTSE-1% + VS-ethoxy | stainless steel | 241 | 50 | 106 | 85 | 221 | 45 |
| BTSE-1% + VS-ethoxy | aluminum | 301 | 95 | 114 | 100 | 288 | 95 |

[a]Maximum Force [N]
[b]Rubber Retention [% R]

For aluminum 100% rubber retention is obtained with the two step process of vinyltriethoxysilane and BTSE, even after aging. With stainless the results are worse and only 45% rubber retention is obtained after aging. Maybe hydrolysis time and presolution composition have to be reconsidered (to complete hydrolysation).

Preliminary data also suggests that silicon wafers and siloxane rubber can be bonded with the two step process [BTSE-1% (pH 4) and VS-5% (pH 4)] and that these joints can successfully withstand etching with a 50%-KOH solution at 80° C. The adhesion of VMQ and FVMQ to silicon wafers has been preliminarily tested. Two types of silicon wafers were tested: 1) a silicon wafer with a silicon oxide surface and 2) a silicon wafer with a nitride coating. Wetting of the silanes on the nitride coating was poor. Adhesion of both wafers to VMQ and FVMQ using the two step process of BTSE-1% (pH 4) and VS-5% (pH 4) looked satisfactory. The adhesion also looked good after etching of the silicon with a 50% KOH solution at 80° C. (the adhesion interface and the elastomer are exposed to this environment).

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Method of adhering a metal substrate to a rubber substrate comprising contacting one of said substrates with an effective adhesive amount of an adhesive treatment comprising an organofunctional silane (I) and a non-organofunctional silane (II); said (I) and (II) being at least partially hydrolyzed, and placing said substrates together with said adhesive treatment interposed therebetween to effect said adhering, said organofunctional silane having the formula

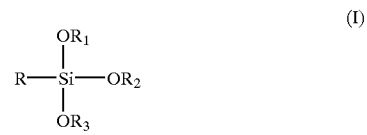

wherein R is a member selected from the group consisting of amino, $C_1$–$C_6$ alkylamino, vinyl, ureido, ureido substituted $C_1$–$C_6$ alkyl, epoxy, epoxy substituted $C_1$–$C_6$ alkyl, mercapto, mercapto substituted $C_1$–$C_6$ alkyl, cyanato, cyanato substituted $C_1-C_6$ alkyl, methacrylato, methacrylato substituted $C_1-C_6$ alkyl, and vinyl benzyl moieties; and $R_1$, $R_2$, and $R_3$ are the same or different and are selected from $C_1-C_6$ alkyl and acetyl groups; and wherein said non-organofunctional silane is represented by the formula

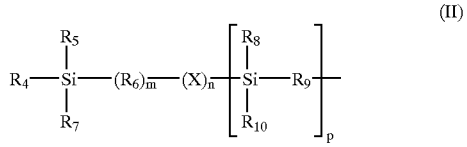
(II)

wherein m is 0 or 1; n is 1; and p is 1; with $R_4$ selected from an aliphatic (saturated or unsaturated) group; aromatic group; or $C_1-C_6$ alkoxy; $R_5$, $R_6$, $R_7$, $R_8$, $R_9$, and $R_{10}$ may be the same or different and are chosen from $C_1-C_6$ alkoxy, H or acetoxy; X, is alkylene, alkenylene, phenylene or amino.

2. Method as recited in claim 1 wherein said non-organofunctional silane is a member selected from the group consisting of 1,2bis(triethoxysilyl)ethane (BTSE); bis(methyl dietboxysilyl)ethane (BDMSE); 1,2-bis(trimethoxysilyl)ethane (TMSE); 1,6-bis(trialkoxysilyl)hexanes and 1,2-bis(trimeothoxysilylpropyl)amine.

3. Method as recited in claim 2 wherein said non-organofunctional silane is BTSE.

4. Method as recited in claim 2 wherein said non-organofunctional silane is BDMSE.

5. Method as recited in claim 2 wherein said organofunctional silane (I) is vinyltrimethoxy silane.

6. Method as recited in claim 1 wherein said contacting comprises dipping one of said substrates in a solution containing said adhesive treatment.

7. Method as recited in claim 6 wherein said adhesive treatment is present in solution at a pH of about 1–7.

8. Method as recited in claim 7 wherein said pH is about 4.

9. Method as recited in claim 6 wherein said adhesive treatment is present in said solution in an amount by volume of about 0.5–10%.

10. Method as recited in claim 1 wherein said organofunctional silane (I) is a vinylsilane selected from the group consisting of vinyltrimethoxysilane, vinyltriethoxysilane and vinyltriacetoxysilane.

11. Method as recited in claim 10 wherein said non-organofunctional silane (II) is selected from the group consisting of 1,2bis(triethoxysilyl)ethane (BTSE) and bis(methyl diethoxysilyl)ethane (BDMSE).

12. Method as recited in claim 10 wherein said organofunctional silane (I) is vinyltrimethoxysilane (VS) and said non-organofunctional silane (II) is (BTSE).

13. Method as recited in claim 10 wherein said contacting comprises coating said metal substrate with said non-organofunctional silane (II) and then providing a coating of said organofunctional silane (I) over said non-organofunctional silane (II) coating and wherein said step of placing comprises placing said rubber substrate along said coating formed by said organafunctional silane (I) so that said organofunctional silane (I) can bond thereto.

14. Method as recited in claim 13 wherein said non-organofunctional silane (II) is BTSE and wherein said organofunctional silane (I) is vinyltrimethoxysilane (VS).

15. Method of adhering a metal substrate to a fluorosilicone rubber substrate comprising contacting one of said substrates with an effective adhesive amount of an adhesive treatment comprising an organofunctional silane (I) and a non-organofunctional silane (II) and mixtures of (I) and (II), said adhesive compound being at least partially hydrolyzed, and placing said substrates together with said adhesive treatment interposed therebetween to effect said adhering, said organofunctional silane having the formula

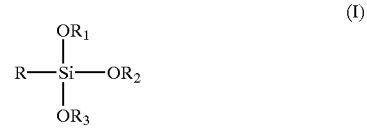
(I)

wherein R is a member selected from the group consisting of amino, $C_1-C_6$ alkylamino, vinyl, ureido, ureido substituted $C_1-C_6$ alkyl, epoxy, epoxy substituted $C_1-C_6$ alkyl, mercapto, mercapto substituted $C_1-C_6$ alkyl, cyanato, cyanato substituted $C_1-C_6$ alkyl, methacrylato, methacrylato substituted $C_1-C_6$ alkyl, and vinyl benzyl moieties; and $R_1$, $R_2$, and $R_3$ are the same or different and are selected from $C_1-C_6$ alkyl and acetyl groups; and wherein said non-organofunctional silane is represented by the formula

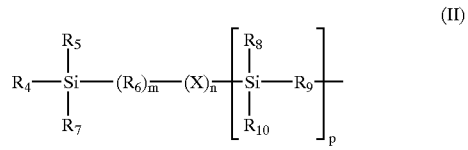
(II)

wherein m is 0 or 1; n is 1; and p is 1; with $R_4$ selected from an aliphatic (saturated or unsaturated) group; aromatic group; or $C_1-C_6$ alkoxy; $R_5$, $R_6$, $R_7$, $R_8$, $R_9$, and $R_{10}$ may be the same or different and are chosen from $C_1-C_6$ alkoxy, H or acetoxy; X, is alkylene, alkenylene, phenylene or amino.

16. Method as recited in claim 15 wherein said non-organofunctional silane is a member selected from the group consisting of 1,2bis(triethoxysilyl)ethane (BTSE), bis(methyl diethoxysilyl)ethane (BDMSE); 1,2-bis(trimethoxysilyl)ethane (TMSE); 1,6-bis(trialkoxysilyl)hexanes and 1,2-bis(trimethoxysilylpropyl)amine.

17. Methd as recited in claim 16 wherein said non-organofunctional silane is BTSE.

18. Method as recited in claim 16 wherein said non-organofunctional silane is BDMSE.

19. Method as recited in claim 15 wherein said contacting comprises dipping one of said substrates in a solution containing said adhesive treatment.

20. Method as recited in claim 19 wherein said adhesive treatment is present in solution at a pH of about 1–7.

21. Method as recited in claim 20 wherein said pH is about 4.

22. Method as recited in claim 19 wherein said adhesive treatment is present in said solution in an amount by volume of about 0.5–10%.

23. Method as recited in claim 15 wherein said organofunctional silane (I) is a vinylsilane selected from the group consisting of vinyltrimethoxysilane, vinyltriethoxysilane and vinyltriacetoxysilane.

24. Method as recited in claim 23 wherein said non-organofunctional silane (II) is selected from the group consisting of 1,2bis(triethoxysilyl)ethane (BTSE) and bis(methyl diethoxysilyl)ethane (BDMSE).

25. Method as recited in claim 24 wherein said organofunctional silane (I) is vinyltrimethoxysilane (VS) and said non-organofunctional silane (II) is (BTS).

26. Method as recited in claim 25 wherein said contacting comprises coating said metal substrate with said non-organofunctional silane (II) and then providing a coating of said organofunctional silane (I) over said non-organofunctional silane (II) coating and wherein said step of placing comprises placing said rubber substrate along said coating formed by said organofunctional silane (I) so that said organofunctional silane can bond thereto.

27. Method recited in claim 26 wherein said non-organofunctional silane (II) is BTSE and wherein said organofunctional silane (I) is vinyltrimethoxysilane (VS).

28. A method for adhesively bonding a metal surface to a rubber surface comprising
1) forming a first layer of a non-organofunctional silane on said metal surface, said non-organofunctional silane having the formula

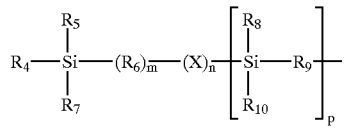

wherein m is 0 or 1; n is 1; and p is 1; with $R_4$ selected from an aliphatic (saturated or unsaturated) group; aromatic group, or $C_1-C_6$ alkoxy; $R_5, R_6, R_7, R_8$, and $R_{10}$ may be the same or different and are chosen from $C_1-C_6$ alkoxy, H, or acetoxy; X is alkylene, alkenylene, phenylene or amino; said non-organofunctional silane being at least partially hydrolyzed;
2) providing a second layer of an organofunctional silane having the formula

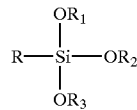

wherein R is a member selected from the group consisting of amino, $C_1-C_6$ alkylamino, vinyl, ureido, ureido substituted $C_1-C_6$ alkyl, epoxy, epoxy substituted $C_1-C_6$ alkyl, mercapto, mercapto substituted $C_1-C_6$ alkyl, cyanato, cyanato subsituted $C_1-C_6$ alkyl, methacrylato substituted $C_1-C_6$ alkyl, and vinyl benzyl moieties, and $R_1, R_2$, and $R_3$ are independently selected from $C_1-C_6$ alkyl and acetoxy groups; said organofunctional silane being at least partially hydrolyzed;
3) positioning said second layer between said first layer and said rubber surface and placing said substrates together with said first and second layers interposed between said metal surface and said rubber surface to adhesively bond them together.

29. A method as recited in claim 28 wherein said rubber surface is fluorosilicone rubber, said non-organofunctional silane being selected from the group consisting of 1,2bis (triethoxysilyl)ethane (BTSE) and bis(methyl diethoxysilyl) ethane (BDMSE) and wherein said organofunctional silane is a vinyltrialkoxysilane.

30. A method as recited in claim 29 wherein said metal surface is chosen from the group consisting of stainless steel, mild steel, and aluminum surfaces.

31. A method as recited in claim 30 wherein said non-organofunctional silane is BTSE and wherein said vinyltri-alkoxysilane is vinyltrimthoxysilane.

32. A method as recited in claim 31 wherein said BTSE is present in an aqueous/alcoholic solution maintained at a pH of about 1–7; said BTSE solution being applied to said metal surface to form said first layer.

33. A method as recited in claim 32 wherein said vinyl-trimethoxysilane solution is applied between said first layer and said rubber surface.

34. A method as recited in claim 28 further comprising drying said first and second layers prior to placing said substrates together.

35. A method as recited in claim 32 wherein said BTSE solution has a pH about 4 and wherein said vinyltrimethox-ysilane solution has a pH of about 4.

* * * * *